US010767772B2

(12) United States Patent
Elder

(10) Patent No.: US 10,767,772 B2
(45) Date of Patent: Sep. 8, 2020

(54) SEAL WITH INTEGRATED FLUID REGULATING DEVICE

(71) Applicant: Hamilton Sundstrand Corporation, Charlotte, NC (US)

(72) Inventor: James S. Elder, South Windsor, CT (US)

(73) Assignee: HAMILTON SUNSTRAND CORPORATION, Charlotte, NC (US)

( * ) Notice: Subject to any disclaimer, the term of this patent is extended or adjusted under 35 U.S.C. 154(b) by 124 days.

(21) Appl. No.: 15/655,244

(22) Filed: Jul. 20, 2017

(65) Prior Publication Data

US 2019/0024809 A1  Jan. 24, 2019

(51) Int. Cl.
| F16K 11/087 | (2006.01) |
| F16K 15/02 | (2006.01) |
| F16L 19/02 | (2006.01) |
| F16K 27/02 | (2006.01) |
| F16L 19/025 | (2006.01) |
| B01D 27/10 | (2006.01) |

(Continued)

(52) U.S. Cl.
CPC .......... F16K 11/087 (2013.01); B01D 27/103 (2013.01); F16K 15/026 (2013.01); F16K 27/0209 (2013.01); F16L 19/025 (2013.01); F16L 19/0225 (2013.01); F16L 37/148 (2013.01); F28G 1/125 (2013.01)

(58) Field of Classification Search
CPC .. F16K 11/087; F16K 15/026; F16K 27/0209; B01D 27/103; F28G 1/125; F16L 19/0225; F16L 19/025; F16L 37/148
See application file for complete search history.

(56) References Cited

U.S. PATENT DOCUMENTS 3,243,209 A * 3/1966 Chertok ................ F16L 27/047
285/261
3,746,376 A * 7/1973 Gold ...................... F16L 19/04
285/334.2
(Continued)

FOREIGN PATENT DOCUMENTS

BE  459616 A   8/1945
FR  2836701 A1  9/2003
(Continued)

OTHER PUBLICATIONS

Search Report dated Dec. 5, 2018 in U380932EP, EP Application No. 18184273.3, 9 pages.

*Primary Examiner* — Kevin F Murphy
*Assistant Examiner* — Patrick C Williams
(74) *Attorney, Agent, or Firm* — Cantor Colburn LLP

(57) ABSTRACT

A seal housing with fluid regulating capability is provided for use with an outlet. The seal housing includes a seal element, a fitting and a valve. The seal element includes an angled flange that is fittable to the outlet and a seal element body from which the angled flange extends. The seal element body defines a bore extending between opposite open ends of the body and receptive of fluid from the outlet. The fitting is configured to tightly engage with the outlet and to urge the angled flange against the outlet with increasing pressure as fitting-outlet engagement proceeds. A valve is constrained within the bore and configured to regulate a flow of the fluid, which is received from the outlet, through the bore.

7 Claims, 3 Drawing Sheets

(51) Int. Cl.
*F16L 37/14* (2006.01)
*F28G 1/12* (2006.01)

(56) References Cited

U.S. PATENT DOCUMENTS

| | | | | |
|---|---|---|---|---|
| 4,492,249 A * | 1/1985 | Arino | ............... | B60T 13/52 |
| | | | | 137/454.2 |
| 4,893,601 A * | 1/1990 | Sugao | ............... | F02M 37/0017 |
| | | | | 123/468 |
| 5,707,152 A | 1/1998 | Krywitsky | | |
| 5,901,743 A * | 5/1999 | Schulz | ............... | A61D 7/00 |
| | | | | 137/515.5 |
| 6,045,162 A | 4/2000 | Haibara | | |
| 7,503,343 B2 * | 3/2009 | Krishnamoorthy | .... | B60K 15/04 |
| | | | | 137/151 |
| 2016/0131273 A1 | 5/2016 | Onishi et al. | | |

FOREIGN PATENT DOCUMENTS

| | | | |
|---|---|---|---|
| GB | 231704 | A | 4/1925 |
| JP | 2001315656 | A | 11/2001 |
| JP | 2010276037 | A | 12/2010 |
| JP | 3176509 | U | 6/2012 |

* cited by examiner

SEAL WITH INTEGRATED FLUID REGULATING DEVICE

BACKGROUND

The following description relates to seals and, more specifically, to a conical seal with a fluid regulating device.

Fluid regulating devices, such as orifices and check valves, are commonly incorporated into fluid systems to provide for required functionality. Once a system has gone into production, however, changes to these fluid regulating devices may require extensive changes to surrounding hardware. Such extensive changes can be time consuming and expensive.

For example, a male outlet may be provided on a housing and may be designed to permit a certain fluid flow magnitude out of the housing. However, if the housing is subsequently put into place and operated it may be discovered that the fluid flow leaving the male outlet needs to be drastically reduced. In such cases, if it were also discovered that a redesign of the male housing in order to achieve the reduction in fluid flow would also require a redesigning of the entire housing, the process of redesigning both the male outlet and the overall housing could be greatly time consuming and expensive.

BRIEF DESCRIPTION

According to an aspect of the disclosure, a seal housing with fluid regulating capability is provided for use with an outlet. The seal housing includes a seal element, a fitting and a valve. The seal element includes an angled flange that is finable to the outlet and a seal element body from which the angled flange extends. The seal element body defines a bore extending between opposite open ends of the body and receptive of fluid from the outlet. The fitting is configured to tightly engage with the outlet and to urge the angled flange against the outlet with increasing pressure as fitting-outlet engagement proceeds. A valve is constrained within the bore and configured to regulate a flow of the fluid, which is received from the outlet, through the bore.

In accordance with additional or alternative embodiments, the angled flange is conical.

In accordance with additional or alternative embodiments, the seal element body includes an aft end which is insertible into the outlet, a forward end and a central portion interposed between the aft and forward ends and from which the angled flange extends about the aft end.

In accordance with additional or alternative embodiments, the fitting includes internal threading which is engageable with external threading of the outlet.

In accordance with additional or alternative embodiments, the fitting includes an annular body which is freely rotatable about the seal element body and includes a surface which is abuttable with the angled flange.

In accordance with additional or alternative embodiments, the valve includes a check valve.

In accordance with additional or alternative embodiments, the valve includes a valve body affixed to an interior facing surface of the seal element body and including a valve seat and a piston which is anchored to the valve body and elastically biased toward the valve seat.

In accordance with additional or alternative embodiments, a spring anchors the piston to the valve body and is configured to elastically bias the piston toward the valve seat.

According to another aspect of the disclosure, a seal is provided for use with a male outlet having a predefined fluid regulating capability. The seal includes a seal body, a female fitting and an intermediate body. The seal body includes an aft end including a first surface abuttable with the male outlet and a second surface opposite the first surface and a forward end defining a bore having a fluid regulating capability reduced as compared to the predefined fluid regulating capability of the male outlet. The female fitting includes an aft end configured for engagement with the male outlet and a forward end disposable about the seal body. The intermediate body is interposable between the female fitting and the seal body and movable about the seal body with the female fitting and includes a surface configured to abut with the second surface and to force the first surface against the male outlet as the aft end of the female fitting engages with the male outlet.

In accordance with additional or alternative embodiments, a check valve is constrained within the bore.

In accordance with additional or alternative embodiments, the male outlet includes a conical end and the first and second surfaces are conical and the forward end of the seal body has a tubular shape.

In accordance with additional or alternative embodiments, an interface between the aft and forward ends of the seal body includes a radial shoulder curving toward the aft end of the seal body a rounded corner that turns toward the forward end of the seal body.

In accordance with additional or alternative embodiments, the aft end of the female fitting includes interior threading which is threadably engageable with exterior threading of the male outlet.

In accordance with additional or alternative embodiments, the forward end of the female fitting is disposable about an entirety of the aft end and a portion of the forward end of the seal body.

In accordance with additional or alternative embodiments, the intermediate body is freely rotatable and translatable about and along the seal body, respectively, and the surface of the intermediate body is conical.

In accordance with additional or alternative embodiments, the forward end of the female fitting and an exterior surface of the intermediate body cooperatively define a wire insertion region.

In accordance with additional or alternative embodiments, a forward-most end of the intermediate body includes a flange and a region defined radially between the flange and the forward end of the seal body is receptive of a tube.

According to yet another aspect of the disclosure, a method of providing a seal for a male outlet having a predefined fluid regulating capability is provided. The method of providing the seal includes forming a seal body, forming a female fitting and forming an intermediate body. The forming of the seal body is conducted such that the seal body includes a seal feature including a first surface abuttable with the male outlet and a second surface opposite the first surface, a tubular feature defining a bore having a fluid regulating capability reduced as compared to the predefined fluid regulating capability of the male outlet and a retention feature configured to trap the seal feature against the tubular feature. The forming of the female fitting is conducted such that the female fitting includes an aft end configured for engagement with the male outlet and a forward end disposable about the seal body. The forming of the intermediate body is conducted such that the intermediate body is interposable between the female fitting and the seal body and movable about the seal body with the female fitting and includes a surface configured to abut with the second surface and to force the first surface against the male outlet as the aft end of the female fitting engages with the male outlet.

In accordance with additional or alternative embodiments, the method further includes constraining a check valve within the bore.

In accordance with additional or alternative embodiments, the male outlet includes a conical end and the first and second surfaces are conical.

These and other advantages and features will become more apparent from the following description taken in conjunction with the drawings.

BRIEF DESCRIPTION OF THE DRAWINGS

The subject matter, which is regarded as the disclosure, is particularly pointed out and distinctly claimed in the claims at the conclusion of the specification. The foregoing and other features, and advantages of the disclosure are apparent from the following detailed description taken in conjunction with the accompanying drawings in which:

These and other advantages and features will become more apparent from the following description taken in conjunction with the drawings.

DETAILED DESCRIPTION

As will be described below, a fluid regulating device is incorporated into a seal or, in some cases, a conical seal that can be captured by a standard fitting. As such, where a male outlet to which the standard fitting is coupled is found to be improperly configured for a certain degree of fluid regulation in a system, the fluid regulating device can be used to provide for the required or needed fluid regulation without having to resort to a redesign of the male outlet or the system as a whole.

Figure 1:
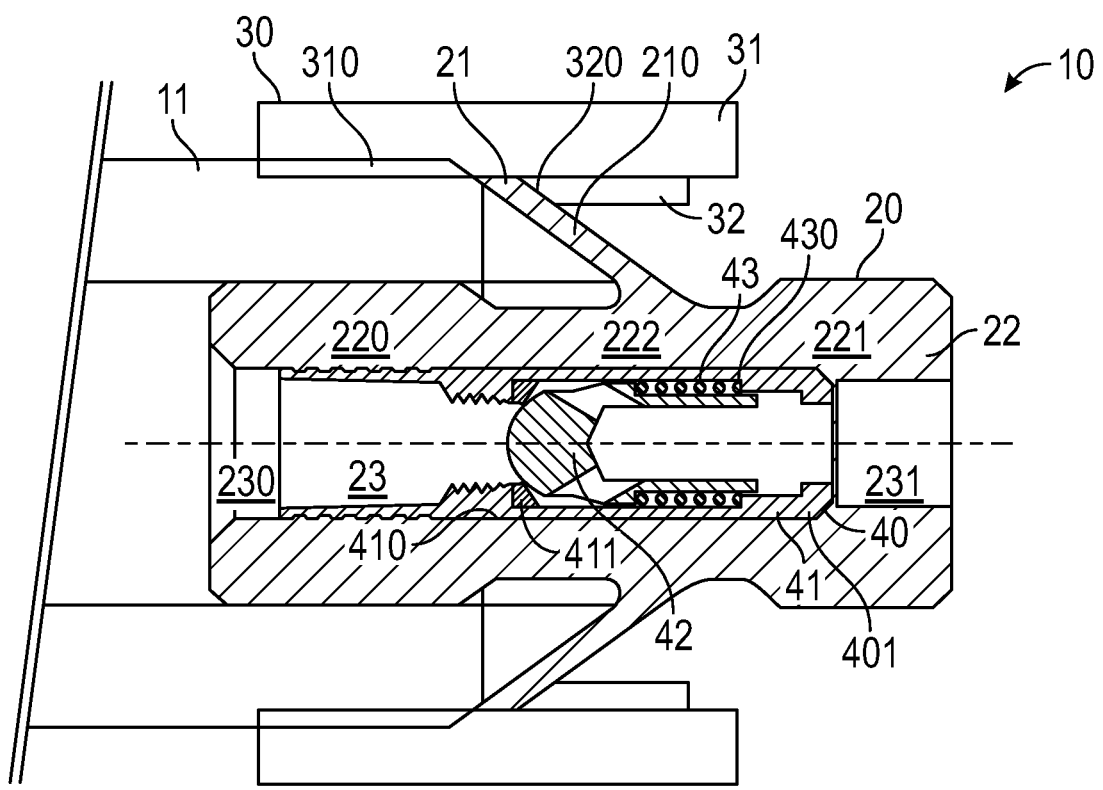
FIG. 1 is a side schematic view of a seal housing for use with an outlet in accordance with embodiments.

With reference to FIG. 1, a seal housing 10 with a fluid regulating capability is provided for use with an outlet 11. The outlet 11 may, for example, be a male outlet of a fluid system that is designed to be coupled to by a female fitting, such as an AN fitting.

As shown in FIG. 1, the seal housing 10 includes a seal element 20, a fitting 30 and a valve 40. The seal element 20 includes an angled flange 21 that is fittable to the outlet 11 and a seal element body 22. The seal element body 22 includes an aft end 220 that is insertible into the male outlet 11, a forward end 221 that is disposed downstream from the aft end 220 and a central portion 222. The central portion 222 is interposed between the aft and forward ends 220 and 221. The angled flange 21 extends outwardly from the central portion 222 such that the angled flange 21 is disposed at least partially about the aft end 220. In accordance with embodiments, the angled flange 21 may be provided as a conical (or frusto-conical) flange 210.

The aft and forward ends 220 and 221 and the central portion 222 of the seal element body 22 are formed to define a bore 23. The bore 23 extends between an aft open end 230 that is defined by the aft end 220 and a forward open end 231 that is defined by the forward end 221. As such, with the angled flange 21 abutting the outlet 11, the bore 23 is receptive of fluid from the outlet 11. In addition, while the outlet 11 has a fluid regulating capacity based on a diameter of the outlet 11 and the velocity of fluid that would normally flow through the outlet 11 during operational conditions, the seal housing 10 has a fluid regulating capacity that reduces that of the outlet 11 based on the bore 23 having a lesser diameter than the outlet 11 and a presence of the valve 40 therein as will be discussed below.

The fitting 30 is configured to tightly engage with the outlet 11 and, in so doing, to urge the angled flange 21 against the outlet 11 with increasing pressure as fitting-outlet engagement proceeds. The fitting 30 may be provided as a female fitting and may include a fitting element 31 and an annular body 32. The fitting element 31 is an annular element and has internal threading 310 which is engageable with external threading of the outlet 11. The annular body 32 is rotatable and translatable with the fitting element 31. The annular body 32 is also freely rotatable about the seal element body 22 and includes a surface 320 that is abuttable with the angled flange 21. In accordance with embodiments, where the angled flange 21 is conical or frusto-conical, the surface 320 may be similarly conical or frusto-conical.

The valve 40 is constrained within the bore 23 and is configured to regulate a flow of the fluid, which is received from the outlet 11, through the bore 23. The valve 40 may be provided as a check valve 401 and may include a valve body 41, a piston 42 and an elastic element 43. The valve body 41 is affixed to an interior facing surface 410 of the seal element body 22 and includes a valve seat 411. The piston 42 is anchored to the valve body 41 by the elastic element 43, which may be a spring 430, and is elastically biased by the elastic element 43 toward the valve seat 411.

Figure 2:
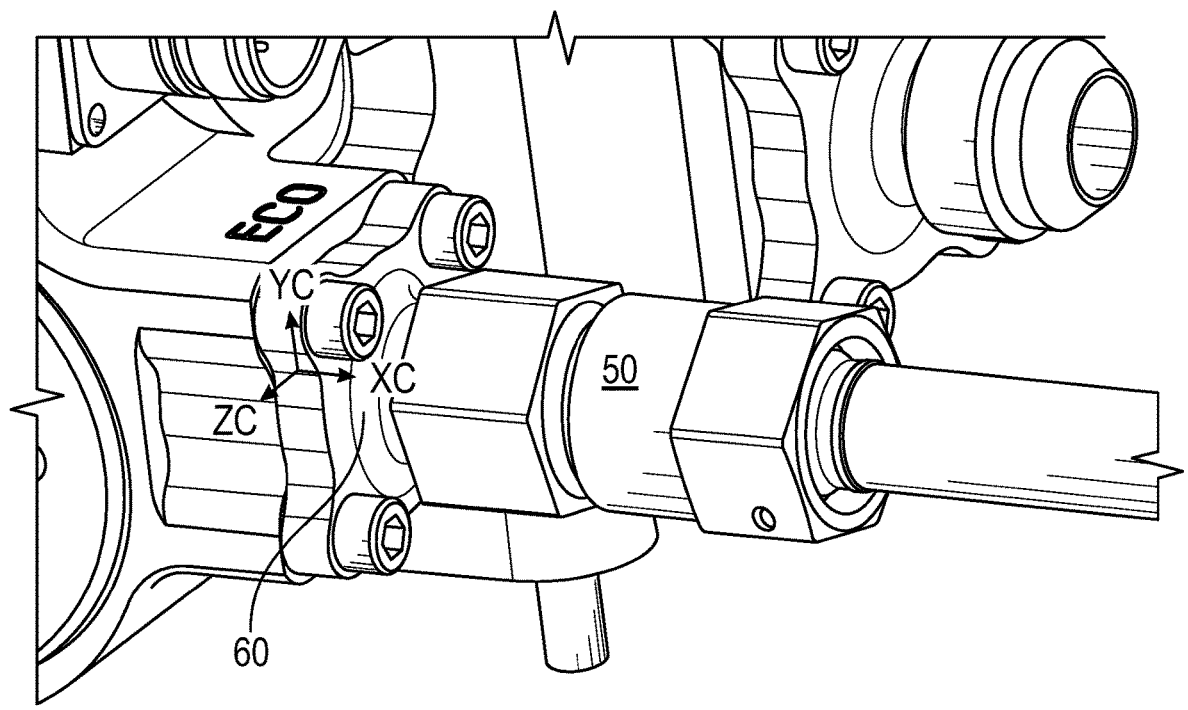
FIG. 2 is a perspective view of a seal provided for use with a male outlet in accordance with embodiments.
Figure 3:
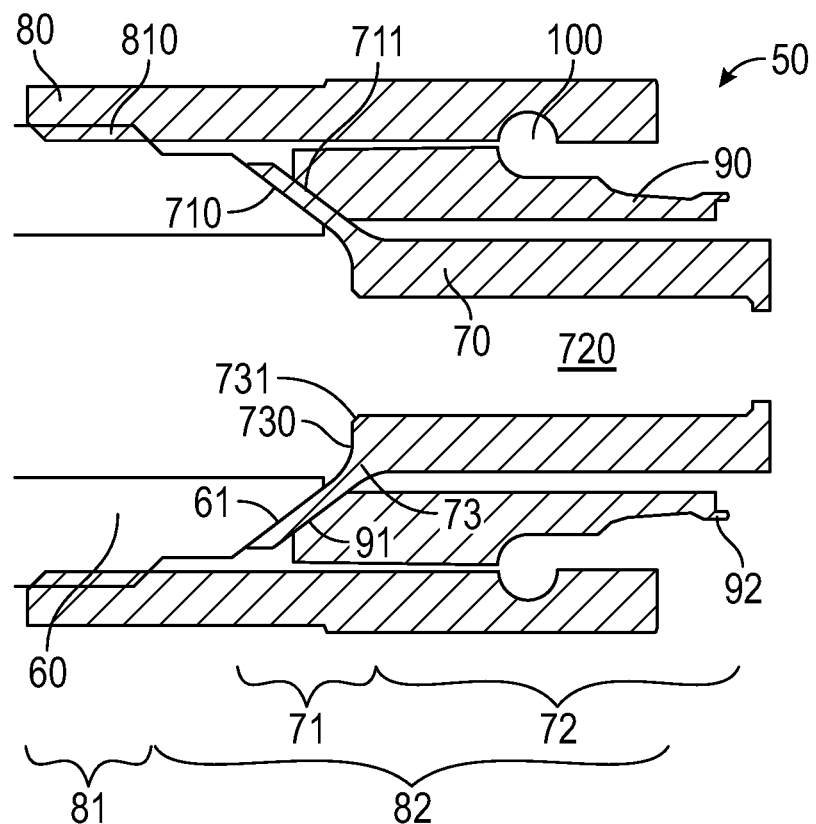
FIG. 3 is a side schematic view of the seal of FIG. 2.

With reference to FIGS. 2 and 3, a seal 50 is provided for use with a male outlet 60 that has a predefined fluid regulating capability and a conical end 61. The seal 50 includes a seal body 70, a female fitting 80 and an intermediate body 90. The seal body 70 includes an aft end 71 and a forward end 72. The aft end 71 includes a first surface 710 that is abuttable with the conical end 61 of the male outlet 60 and a second surface 711 that is opposite the first surface 710. The first and second surfaces 710 and 711 may be conical or frusto-conical to complement the conical end 61 of the male outlet 11. The forward end 72 is disposed downstream from the aft end 71 and may have a tubular shape such that the forward end 72 is formed to define a bore 720 that has a fluid regulating capability which is reduced as compared to the predefined fluid regulating capability of the male outlet 60.

In accordance with embodiments, an interface 73 is provided between the aft and forward ends 71 and 72 of the seal body 70. Such an interface 73 may include a radial shoulder 730 and a rounded corner 731. The radial shoulder 730 extends radially outwardly from the bore 720 and curves toward the aft end 71. The rounded corner 731 turns from the radial shoulder 730 and extends toward the forward end 72.

Although not shown, a check valve, such as the check valve 401 of FIG. 1, may be constrained within the bore 720 to provide for fluid flow regulation.

The female fitting 80 includes an aft end 81 that is configured for engagement with the male outlet 60 and a forward end 82. The aft end 81 may be provided as an annular body that includes interior threading 810 that is threadably engageable with exterior threading of the male outlet 60. The forward end 82 is generally disposable about the seal body 70 and is particularly disposable about an entirety of the aft end 71 of the seal body 70 and only a portion of the forward end 72 of the seal body 70.

The intermediate body 90 is interposable between the female fitting 80 and the seal body 70. The intermediate body 90 is movable about the seal body 70 with the female fitting 80 and includes a surface 91. The surface 91 is configured to abut with the second surface 711 of the aft end 71 of the seal body 70 and is further configured to force the first surface 710 against the conical end 61 of the male outlet 60 as the aft end 81 of the female fitting 80 engages with the male outlet 60. In accordance with embodiments, the intermediate body 90 is freely rotatable about and translatable along the seal body 70. In accordance with further embodiments, the surface 91 may be conical to complement the second surface 711 of the seal body 70.

In accordance with further embodiments, the forward end 82 of the female fitting 80 and an exterior surface of the intermediate body 90 may be formed to cooperatively define a wire insertion region 100. In addition, a forward-most end of the intermediate body 90 may include an axial flange 92 such that a region defined radially between the axial flange 92 and the forward end 72 of the seal body 70 is receptive of a tubular element 93 (see FIG. 2).

Figure 4:
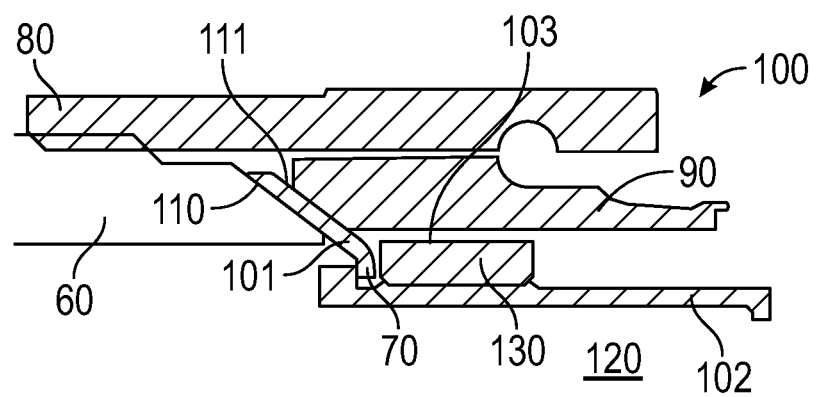
FIG. 4 is a side schematic view of a seal in accordance with alternative embodiments.

With reference to FIG. 4, a seal 100 is provided for use with a male outlet having a predefined fluid regulating capability. As shown in FIG. 4, the seal 100 is generally similar to the seal 50 of FIGS. 2 and 3, but for the configuration of the seal body 70. That is, the seal body 70 of the seal 100 includes a seal feature 101, a tubular feature 102 that the seal feature 101 is not integrally connected with and a retention feature 103. The seal feature 101 includes a first surface 110 that is abuttable with the male outlet 60 and a second surface 111 that is opposite the first surface 110. The tubular feature 102 is formed to define a bore 120 having a fluid regulating capability reduced as compared to the predefined fluid regulating capability of the male outlet 60. Again, although not shown, a check valve, such as the check valve 401 of FIG. 1, may be constrained within the bore 120 to provide for fluid flow regulation. The retention feature 103 is configured to trap the seal feature 101 against the tubular feature 102 and may be provided as a nut 130 that is rotatably and threadably fastened to the tubular feature 102.

While the disclosure is provided in detail in connection with only a limited number of embodiments, it should be readily understood that the disclosure is not limited to such disclosed embodiments. Rather, the disclosure can be modified to incorporate any number of variations, alterations, substitutions or equivalent arrangements not heretofore described, but which are commensurate with the spirit and scope of the disclosure. Additionally, while various embodiments of the disclosure have been described, it is to be understood that the exemplary embodiment(s) may include only some of the described exemplary aspects. Accordingly, the disclosure is not to be seen as limited by the foregoing description, but is only limited by the scope of the appended claims.

What is claimed is:

1. A seal housing with fluid regulating capability for use with an outlet, the seal housing comprising:
    a seal element comprising an angled flange that is fittable to the outlet and a seal element body from which the angled flange extends,
    the seal element body defining a bore extending between opposite open ends of the body and receptive of fluid from the outlet;
    a fitting configured to tightly engage with the outlet and to urge the angled flange against the outlet with increasing pressure as fitting-outlet engagement proceeds; and
    a valve constrained within the bore and configured to regulate a flow of the fluid, which is received from the outlet, through the bore,
    wherein:
    the bore extends through a portion of the outlet and beyond an end of the outlet and has a longitudinal axis,
    the seal element body comprises an exterior surface defining a recess from which the angled flange extends at an angle relative to the longitudinal axis of the bore,
    the angled flange is conical, tapering along the longitudinal axis of the bore from wide to narrow with decreasing distance from the bore, and comprises a first side to register with the outlet and a second side parallel with and opposite the first side, and
    the valve is disposed at an axial location defined along the bore, which is downstream relative to the flow of the fluid from a forward-most portion of the angled flange.

2. The seal housing according to claim 1, wherein the seal element body comprises:
    an aft end which is insertible into the outlet;
    a forward end; and
    a central portion interposed between the aft and forward ends and from which the angled flange extends about the aft end.

3. The seal housing according to claim 1, wherein the fitting comprises internal threading which is engageable with external threading of the outlet.

4. The seal housing according to claim 1, wherein the fitting comprises an annular body which is freely rotatable about the seal element body and comprises a surface which is abuttable with the angled flange.

5. The seal housing according to claim 1, wherein the valve comprises a check valve.

6. A method of providing a seal for a male outlet having a predefined fluid regulating capability, the method of providing the seal comprising:
    forming a seal body such that the seal body comprises:
        a seal feature comprising a radially inward portion and a radially outward portion, the radially outward portion comprising a conical flange extending from the recess and including first and second conical surfaces, the first surface being abuttable with a conical surface of an end of the male outlet and the second surface being parallel with and opposite the first surface;
        a tubular feature comprising an exterior surface defining a recess from which a shoulder protrudes and an interior surface defining a bore having a fluid regulating capability reduced as compared to the predefined fluid regulating capability of the male outlet, the bore extending through a portion of the male outlet and beyond an end of the male outlet and having a longitudinal axis and the flange extending from the recess at an angle relative to the longitudinal axis whereby the first and second conical surfaces taper from wide to narrow along the longitudinal axis with decreasing distance from the bore; and
        a retention feature configured to trap the radially inward portion of the seal feature against the shoulder of the tubular feature;
    forming a female fitting such that the female fitting comprises:
        an aft end configured for engagement with the male outlet; and
        a forward end disposable about the seal body; and forming an intermediate body to be interposable between the female fitting and the seal body and movable about the seal body with the female fitting, the intermediate body comprising a surface configured to abut with the second surface and to force the first surface against the male outlet as the aft end of the female fitting engages with the male outlet.

7. The method of providing the seal according to claim 6, further comprising constraining a check valve in the bore.

\* \* \* \* \*